(12) United States Patent
Cakmak

(10) Patent No.: US 10,005,247 B2
(45) Date of Patent: Jun. 26, 2018

(54) ELECTROMAGNETIC PROCESSING LINE

(71) Applicant: Mukerrem Cakmak, Munroe Falls, OH (US)

(72) Inventor: Mukerrem Cakmak, Munroe Falls, OH (US)

(73) Assignee: The University of Akron, Akron ( * ) Notice: Subject to any disclaimer, the term of this patent is extended or adjusted under 35 U.S.C. 154(b) by 105 days.

(21) Appl. No.: 15/134,929

(22) Filed: Apr. 21, 2016

(65) Prior Publication Data

US 2016/0229131 A1   Aug. 11, 2016

Related U.S. Application Data

(63) Continuation of application No. 13/384,026, filed as application No. PCT/US2010/041992 on Jul. 14, 2010, now abandoned.

(Continued)

(51) Int. Cl.
  B29C 71/00 (2006.01)
  B29C 41/28 (2006.01)
  (Continued)

(52) U.S. Cl.
  CPC .......... B29C 71/0072 (2013.01); B29C 41/28 (2013.01); B29C 55/00 (2013.01);
  (Continued)

(58) Field of Classification Search
  CPC ..... B29C 71/0072; B29C 41/28; B29C 55/00; B29C 71/02; B29C 33/68; B29C 35/0805; B29C 2035/0822; B29C 2071/022; B29C 2791/004; B29C 65/1432; B29C 65/1496; B29C 65/76; B29C 66/028; B29C 66/1122; B29C 66/43; B29C 66/71; B29C 66/7465; B29C 66/919; B29C 65/02; B29C 66/41; B29C 66/9141; B29C 66/91445; B29C 66/73161; B29C 66/73111; B29C 66/73117; B29C 66/7352; B29C 66/7394; B29C 59/14; B29C 2035/0827; B29C 66/9121; B29C 66/91216; B29C 66/91311; B29C 66/91313; B29C 66/91315;
  (Continued)

(56) References Cited

U.S. PATENT DOCUMENTS 5,231,525 A * 7/1993 Yuasa .................... B29C 55/00
                                                           349/124
2006/0279679 A1* 12/2006 Fujisawa .............. G02B 5/0221
                                                           349/116

* cited by examiner

*Primary Examiner* — Xiuyu Tai
(74) *Attorney, Agent, or Firm* — Renner Kenner Greive Bobak Taylor & Weber

(57) ABSTRACT

A film-processing apparatus for manufacturing a film in a continuous process includes a continuous carrier belt; a film-casting zone depositing a cast film on the carrier belt; a shearing zone; an electric-field zone; a magnetic-field zone; an ultraviolet-radiation zone; an annealing zone; and a solvent-evaporation zone, wherein the continuous carrier belt is operable to move a cast film deposited thereon from the film-casting zone through the shearing zone, the electric-field zone, the magnetic-field zone, the ultraviolet-radiation zone, the annealing zone, and the solvent-evaporation zone such that the cast film is selectively treated in one or more of the zones in a continuous process. A pick up roll receives the cast film after the continuous carrier belt moves the cast film through the zones and is selectively treated.

9 Claims, 4 Drawing Sheets

Related U.S. Application Data

(60) Provisional application No. 61/225,403, filed on Jul. 14, 2009.

(51) Int. Cl.
  *B29C 55/00* (2006.01)
  *B29C 71/02* (2006.01)
  *B29C 35/08* (2006.01)
  *B29K 105/16* (2006.01)
  *B29C 33/68* (2006.01)
  *B29K 105/00* (2006.01)
  *B29L 7/00* (2006.01)

(52) U.S. Cl.
  CPC ............. *B29C 71/02* (2013.01); *B29C 33/68* (2013.01); *B29C 35/0805* (2013.01); *B29C 2035/0822* (2013.01); *B29C 2035/0827* (2013.01); *B29C 2071/022* (2013.01); *B29C 2791/004* (2013.01); *B29K 2105/0002* (2013.01); *B29K 2105/162* (2013.01); *B29K 2827/18* (2013.01); *B29K 2905/12* (2013.01); *B29K 2995/0008* (2013.01); *B29L 2007/008* (2013.01)

(58) Field of Classification Search
  CPC ............. B29C 66/953; B29C 65/1406; B29C 66/7315; B29C 66/7392; B29K 2105/0002; B29K 2105/162; B29K 2827/18; B29K 2905/12; B29K 2995/0008; B29K 2995/0072; B29K 2079/08; B29K 2105/0079; B29L 2007/008; C08G 73/105; C08G 73/1067; C08G 73/1071; C08G 73/1085; C08G 73/22; C08L 79/08; Y10T 428/31725; Y10T 428/24851; Y10T 156/10; Y10T 428/24802; G02F 1/133305; G02F 1/133365; G02F 2001/133607; G02B 5/0221; G02B 5/0242; G02B 5/0268; G02B 5/0278; G02B 5/0284; B32B 7/06; B32B 38/0004; B32B 38/10; B32B 27/16; B32B 27/281; B32B 27/34; B32B 38/0008; B32B 2315/08; B32B 2379/08; B32B 2255/10; B32B 2255/26; B32B 2307/306; B32B 2307/71; B32B 2307/734; B32B 2307/748; B32B 2457/00; B32B 2307/40; B32B 2457/20; B32B 2457/202
  See application file for complete search history.

ELECTROMAGNETIC PROCESSING LINE

CROSS-REFERENCE TO RELATED APPLICATIONS

This application is a Continuation of U.S. patent application Ser. No. 13/384,026, filed Feb. 17, 2012, which is a National Stage filing of PCT/US2010/041992, filed Jul. 14, 2010, which claims priority to U.S. Provisional Patent Application No. 61/225,403, filed on Jul. 14, 2009, titled "Electromagnetic Processing Line," the entirety of which is hereby incorporated by reference herein.

FIELD OF THE INVENTION

A method for manufacturing a film, the method comprising the steps: creating a cast film having a polymer component, a monomer component, a nanoparticle component, a magnetic-filler component, or a combination thereof; shearing the cast film; aligning a cast-film component by applying an electric field to the cast film; aligning a cast-film component by applying a magnetic field to the cast film; curing or polymerizing a cast-film component; annealing the cast film; and evaporating solvent from the cast film.

BACKGROUND OF THE INVENTION

Cast films and methods for their manufacture are known. There remains a need in the art for cast-film manufacturing methods.

SUMMARY OF THE INVENTION

A method for manufacturing a film, the method comprising the steps: creating a cast film having a polymer component, a monomer component, a nanoparticle component, a magnetic-filler component, or a combination thereof; shearing the cast film; aligning a cast-film component by applying an electric field to the cast film; aligning a cast-film component by applying a magnetic field to the cast film; curing or polymerizing a cast-film component; annealing the cast film; and evaporating solvent from the cast film.

A method for manufacturing a film, the method comprising the steps: first, creating a cast film having a polymer component, a monomer component, a nanoparticle component, a magnetic-filler component, or a combination thereof; second, shearing the cast film; third, aligning a cast-film component by applying an electric field, a magnetic field, or both to the cast film; fourth, curing or polymerizing a cast-film component; fifth, annealing the cast film; and sixth, evaporating solvent from the cast film.

A method for manufacturing a film, the method comprising the steps: creating a cast film having a polymer component, a monomer component, a nanoparticle component, a magnetic-filler component, or a combination thereof; shearing the cast film annealing the cast film; and evaporating solvent from the cast film.

A method for manufacturing a film, the method comprising the steps: creating a cast film having a polymer component, a monomer component, a nanoparticle component, a magnetic-filler component, or a combination thereof; aligning a cast-film component by applying an electric field to the cast film; aligning a cast-film component by applying a magnetic field to the cast film; curing or polymerizing a cast-film component; annealing the cast film; and evaporating solvent from the cast film.

A processing advantage of using a curable matrix material is that the use of solvent is eliminated, which ameliorate the problem of handling volatile organic compounds (VOC) and the difficulty in completely removing residual solvent from the final cast film.

DETAILED DESCRIPTION OF THE INVENTION

Figure 1:
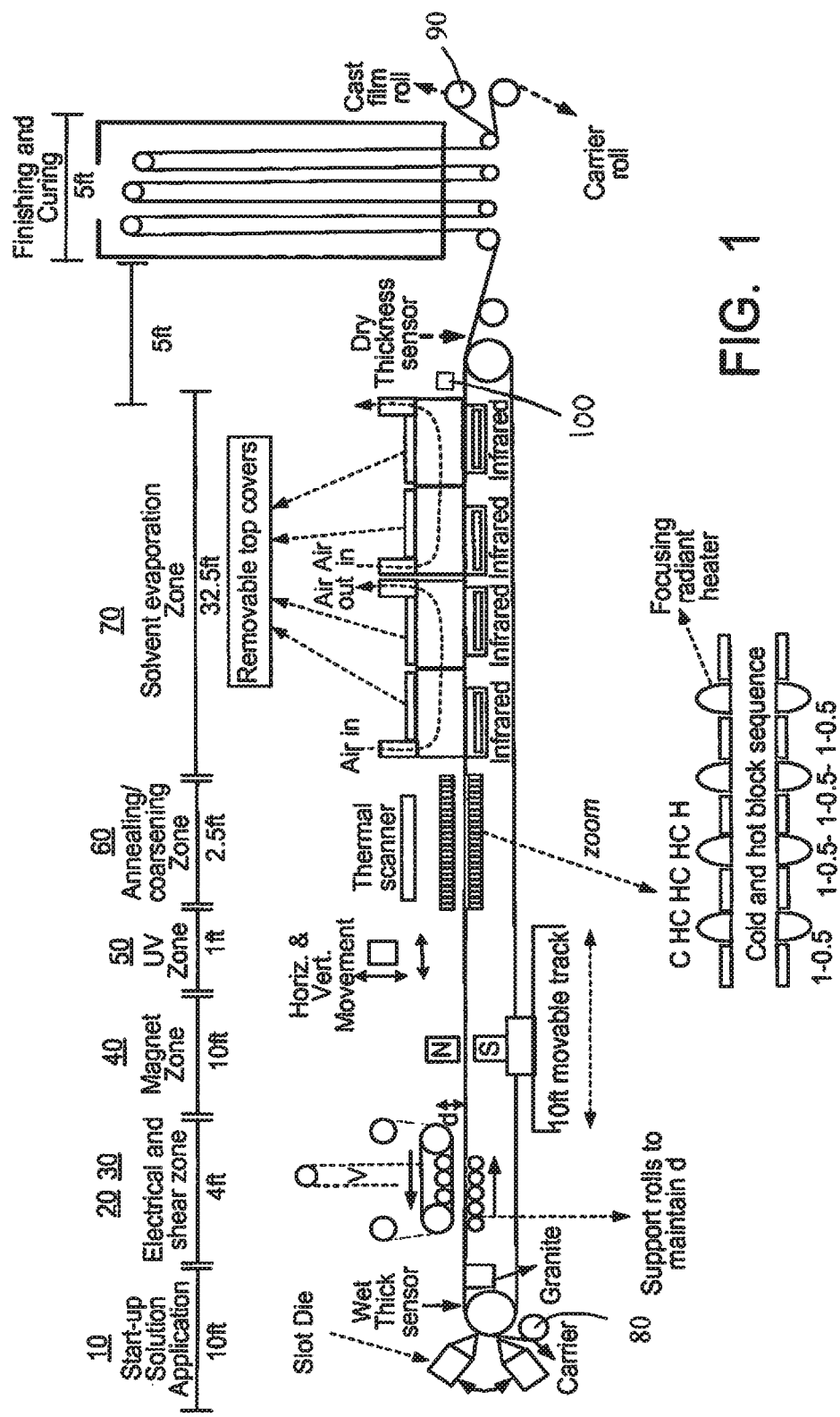
FIG. 1 is a conceptual drawing showing an embodiment of treatment zones of the system.
Figure 2:
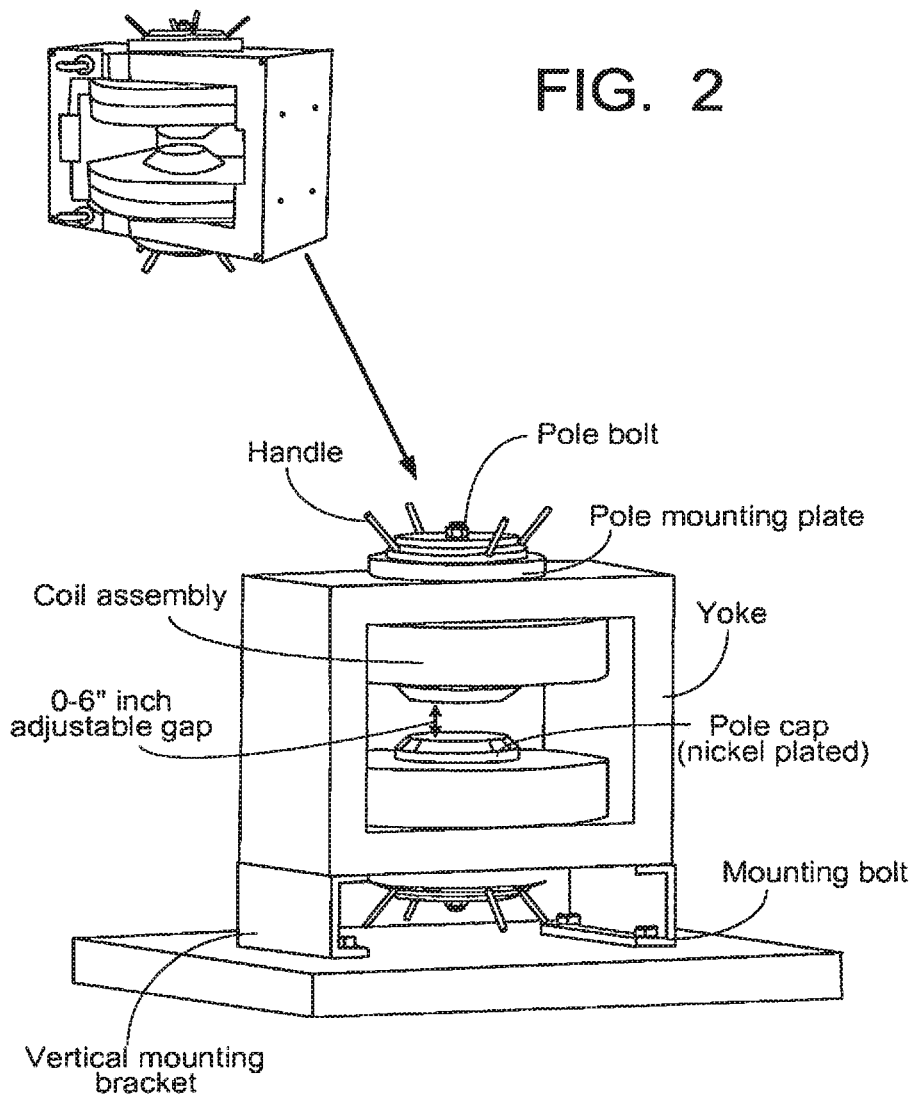
FIG. 2 shows useful magnet dimensions.
Figure 3:
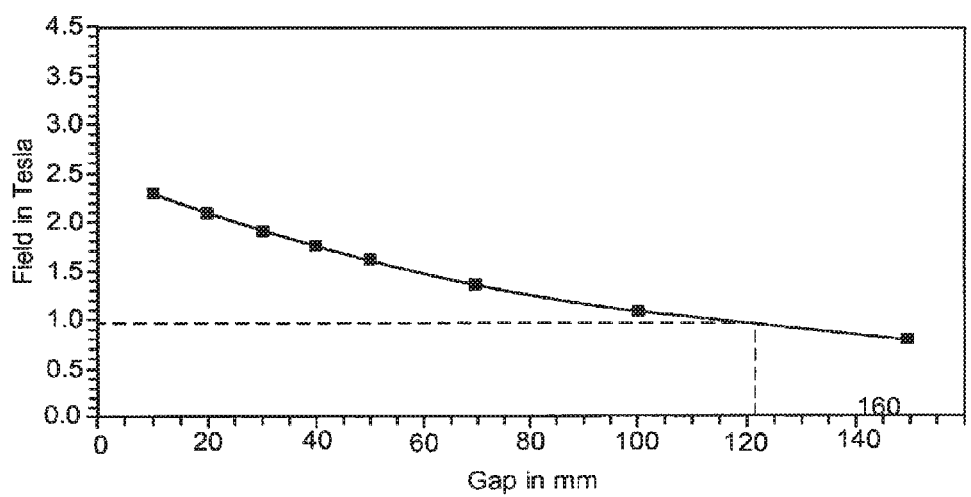
FIG. 3 is a table illustrating an embodiment of the relationship between Awps, Tesla, and gap.

A method for manufacturing a film, the method comprising the steps: creating a cast film having a polymer component, a monomer component, a nanoparticle component, a magnetic-filler component, or a combination thereof; shearing the cast film; aligning a cast-film component by applying an electric field to the cast film; aligning a cast-film component by applying a magnetic field to the cast film; curing or polymerizing a cast-film component; annealing the cast film; and evaporating solvent from the cast film.

Embodiments generally provide a method for manufacturing a cast film, wherein the method includes a plurality of treatment zones. With reference to the Figures, embodiments provide a method for manufacturing a cast film, the method having a plurality of cast-film treatment zones that include: film-casting zone 10, shearing zone 20, electric-field zone 30, magnetic-field zone 40, ultraviolet-radiation zone 50, annealing zone 60, solvent-evaporation zone 70, and combinations thereof.

Embodiments provide for the continuous production of various types of cast-film products. Processing embodiments include i) electrical force with or without the combination of steady or oscillatory shear, ii) magnetic field, and iii) thermal annealing under thermal gradients to promote defect-free or substantially defect-free nanostructured products. Embodiments provide for any combination of cast-film treatment zones to be included in a roll-to-roll process. In some embodiments, a "roll-to-roll" process means a series of method steps that are performed in a single pass through a processing apparatus. In FIG. 1 it is seen that a carrier substrate comes off of a roll 80 and the cast film riding thereon is taken up on a pick-up roll 90. Non-limiting examples of useful film products that can be manufactured using one or more of the subject processing embodiments include:

a) Block copolymer films through phase separation into desired phase—for example cylindrical phase—to create large periodic nanomorphologies for next generation microelectronics and data storage;

b) Thin films with magnetically aligned functional fillers in the thickness direction of the film useful for wide range of applications including photovoltaic roll-to-roll manufacturing, separation membranes including fuel cell membranes.

In order to create a cast film at the film-casting zone 10, embodiments provide /e.g. Mylar, aluminum, and etc.), and the carrier substrate is supported on a stainless-steel belt. In addition to casting films onto the carrier substrate, embodiments also provide for casting films directly onto the stainless-steel belt. An embodiment provides that solution casting may be accomplished with a dual reservoir doctor blade and a supporting substrate that is ultra precision granite. In an embodiment, the granite section is long enough to accommodate 2 foot long multi layer doctor blades as well as a three manifold flex lip slot die assembly with solution delivery system run by gear pumps. In an embodiment, the film is cast at an initial thickness ranging from 0.0002 inches (4 micrometers) to 0.100 inches (2540 micrometers). In an embodiment, the viscosity of the solution that is cast into a film may be in the range of 5 cP to 50000 cP. Embodiments provide for the system to include an electrical and mechanical automation system that drives separate gear pumps, piping, metering, valves, sensors and supply to enable the films to be cast in useful layer thicknesses.

Any known method for casting films onto a substrate may be used in film-casting zone 10. Solutions that are useful for film casting may include various concentrations and combinations of the following components: solvent component, polymer component, monomer component, nanoparticle component, and magnetic-filler component.

Useful concentrations of the solvent component range from 0 weight percent to about 70 weight percent, from about 2.5 weight percent to about 67.5 weight percent, from about 5 weight percent to about 65 weight percent, from about 7.5 weight percent to about 60 weight percent, from about 10 weight percent to about 55 weight percent, from about 12.5 weight percent to about 50 weight percent, from about 15 weight percent to about 45 weight percent, from about 17.5 weight percent to about 40 weight percent, from about 20 weight percent to about 35 weight percent, from about 22.5 weight percent to about 30 weight percent, or even from about 25 weight percent to about 27.5 weight percent. Here, as well as elsewhere in the specification and claims, individual range values and/or limits can be combined to form additional non-disclosed, or new, ranges, or even open ended ranges. Non-limiting examples of useful solvents include, but are not limited to, N-methyl pyrrolidone (NMP), dimethylformamide (DMF), dimethylsulfide (DMS), dimethylsulfoxide (DMSO), dimethyl acetamide (DMAC), cyclohexane, pentane, cyclohexanone, acetone, methylene chloride, carbon tetrachloride, ethylene dichloride, chloroform, ethanol, isopropyl alcohol (IPA), butanols, THF, MEK, MIBK, toluene, heptane, hexane, 1-pentanol, water, or suitable mixtures of two or more thereof.

| Solvents | Boiling Point (° C.) | Density 25° C. (g/cc) | Density @ 25° C. (lb/gallons) |
|---|---|---|---|
| N-Methyl Pyrrolidone (NMP) | 202 | 1.032 | 8.6227 |
| Dimethylformamide (DMF) | 153-155 | 0.948 | 7.9209 |
| Dimethylsulfide(DMS) | | 0.846 | 7.068668 |
| Dimethylsulfoxide (DMSO) | 189 | 1.1 | 9.19094 |
| Dimethyl Acetamide (DMAC) | 165-167 | 0.94 | 7.854076 |
| Cyclohexane | 80 | 0.94 | 7.854076 |
| Pentane | 35 | 0.63 | 5.263902 |
| MEK | 80 | 0.804 | 6.717742 |
| MIBK | 118 | 0.80 | 6.68432 |
| Cyclohexanone | 155 | 0.945 | 7.895853 |
| Acetone | 56 | 0.786 | 6.567344 |
| Methylene Chloride | 40 | 1.32 | 11.02913 |
| Carbon Tetrachloride | 76 | 1.59 | 13.28509 |
| Ethylene Dichloride | 83 | 1.25 | 10.44425 |
| Chloroform | 61 | 1.5 | 12.5331 |
| Ethanol | 78 | 0.789 | 6.592411 |
| Isopropyl Alcohol (IPA) | 82 | 0.804 | 6.717742 |
| Butanols | 116-118 | 0.8108 | 6.774558 |
| THF | 65-67 | 0.88 | 7.352752 |
| Toluene | 110 | 0.86 | 7.185644 |
| Heptane | 98 | 0.68 | 5.681672 |
| Hexane | 69 | 0.66 | 5.514564 |
| 1-pentanol | 136-138 | 0.815 | 6.809651 |
| Water | 100 | 1.00 | 8.3554 |

Useful concentrations of polymer component range from about 5 weight percent to about 50 weight percent, from about 7.5 weight percent to about 47.5 weight percent, from about 10 weight percent to about 45 weight percent, from about 12.5 weight percent to about 42.5 weight percent, from about 15 weight percent to about 40 weight percent, from about 17.5 weight percent to about 37.5 weight percent, from about 20 weight percent to about 35 weight percent, from about 22.5 weight percent to about 32.5 weight percent, or even from about 25 weight percent to about 30 weight percent. Here, as well as elsewhere in the specification and claims, individual range values and/or limits can be combined to form additional non-disclosed, or new, ranges, or even open ended ranges. Non-limiting examples of useful polymers include: polyimides and their copolymers, ionomers, polymer blends that also contain functional additives, wide range of block copolymers. Polymers having magnetic properties, otherwise known as "magnetic polymers" to persons of ordinary skill in the art, are also useful.

Useful concentrations of monomer component range from 0 weight percent to 100 weight percent. Depending on the monomer content at intermediate concentrations, the remainder of the content could include another polymer and solvent mixture. Non-limiting examples of useful monomers include: photo-functional monomers and monomers with useful reactive properties.

Useful concentrations of nanoparticle component range from about 0.01 weight percent to about 30 weight percent, from about 0.1 weight percent to about 27.5 weight percent, from about 0.5 weight percent to about 25 weight percent, from about 1 weight percent to about 22.5 weight percent, from about 2.5 weight percent to about 20 weight percent, from about 5 weight percent to about 17.5 weight percent, from about 7.5 weight percent to about 15 weight percent, or even from about 10 weight percent to about 12.5 weight percent. Here, as well as elsewhere in the specification and claims, individual range values and/or limits can be combined to form additional non-disclosed, or new, ranges, or even open ended ranges. In another embodiment, a useful concentration of nanoparticle component ranges from about 1 weight percent to about 8 weight percent. Non-limiting examples of useful nanoparticles include: magnetic nanoparticles with or without ligand modifications, organically modified clays, carbon based nanoparticles, carbon black, carbon nanotubes (single as well as multi-walled) as well as other inorganic and organic synthetic or natural nanoparticles.

Useful concentrations of magnetic-filler component range from about 0.01 weight percent to about 15 weight percent, from about 0.1 weight percent to about 12.5 weight percent, from about 0.5 weight percent to about 10 weight percent, from about 1 weight percent to about 7.5 weight percent, from about 1.25 weight percent to about 5 weight percent, from about 1.5 weight percent to about 4 weight percent, from about 1.75 weight percent to about 3.5 weight percent, from about 2 weight percent to about 3 weight percent. Here, as well as elsewhere in the specification and claims, individual range values and/or limits can be combined to form additional non-disclosed, or new, ranges, or even open ended ranges. Non-limiting examples of useful magnetic-fillers include: Co, Ni, CoPt, FePt, FeCo, $Fe_3O_4$, $Fe_2O_3$, $CoFe_2O_4$. Persons of skill in the art will be able to create and determine useful cast-film solutions without having to exercise undo experimentation.

Embodiments provide for the stainless-steel belt being manufactured from a non-magnetized austenitic molybdenum alloyed stainless steel with corrosion resistance. The stainless steel belt may be surface finished and processed for thickness uniformity.

Embodiments provide for both the stainless steel belt and the carrier belt (the carrier belt also referred to herein as a carrier substrate) having independent drive controls. Overall speed range capability may range from 0.2 in/min to 840 in/min. In the range of 0.2 to 400 in/min (0.5 cm/min to 1010 cm/min), a control precision within 0.01 percent is within the scope of an embodiment. Programmable speed control for the stainless-steel belt as well as the carrier belt is within the scope of an embodiment. Embodiments include linear as well as move-stop-move type of modes where move distance at specified speed, stop and dwell time can be user input.

Both the carrier substrate and the stainless steel belt may have automatic belt tracking throughout the process. The drums for the stainless steel belt may be non-corrosive. The carrier belt substrate may have adjustable web tension ranging from 0.05 to 3 PLI.

Embodiments that have shearing zone 20 comprise a secondary belt or shearing belt (e.g., 6 foot long) moving above the stainless-steel belt, wherein the distance between the shearing belt and the stainless-steel belt is adjustable. The distance between: (i) the stainless-steel belt or carrier substrate; and (ii) the sheering belt can range from about 10 to about 2000 micrometers. The function of this secondary or shearing belt is to shear the cast film while it is moving on either the carrier substrate or the stainless-steel belt.

Embodiments provide for shear belt movement to be automated, and recipe selectable, with three modes of operation:
(1) Forward (clockwise drive) (with flow of material);
(2) Reverse (counter clockwise) (against flow of material); and
(3) Oscillation (Back and forth movement: the amplitude which is the distance of oscillation (0 to 2 foot) should be adjustable with a frequency that is 0 to 60 reversal/min).

Embodiments provide for speed requirements that range from 4 to 400 inches/min. Embodiments also provide for using any combination of the above shear-belt modes of operation.

Thermal expansion issues of the shearing belt and also sagging of the shearing belt with time is taken into account. There may be a continuously monitoring means of the distance with laser sensors or equivalent sensors between: (i) the stainless-steel belt or carrier substrate; and (ii) the sheering belt to maintain the distance with precision and control of the distance by tensioning or other methods known in the art.

An embodiment provides for the top shearing belt having constant speed (0.2 to 400 in/min) as well as oscillation capability with adjustable frequency (reversal/min) and amplitude (distance) range. In an embodiment, the distance ranging from 0 to 2 foot is adjustable with an adjustable reversal/min frequency ranging from 0 to 60 reversal/min. Other useful shearing-belt distances and reversal/min frequencies are within the scope of this invention and may be arrived at by persons of ordinary skill in the art without having to exercise undo experimentation.

In order to prevent sticking of the cast film to the stainless-steel belt, a polytetrafluoroethylene (PTFE) based film may be a carrier substrate or layer between the stainless-steel belt and the cast film. Embodiments provide for a carrier control drive capability being used in combination with the shearing top belt. A separation blade or scraping knife may be used to detach the cast film from the top shearing belt after it comes out of the shearing zone.

Embodiments that have electric-filed zone 30, application of an electric field to the cast film may be automated. Embodiments provide for the electric field to be voltage applied to the cast film. The electric field may be applied to the cast film while the cast film is in the shear zone. Any range of voltage may be applied to the cast film, and in an embodiment the applied voltage ranges from 0 volts to 25 KV/cm (in the micro-amps range).

In embodiments that have magnetic-field zone 40, the magnetic-field zone may be used to align magnetic fillers dispersed in the cast film. Embodiments provide that the system for applying a magnetic field within the magnetic-field zone is automated and recipe driven. In an embodiment, magnetic system may be on a two axis automated (10 foot horizontal run, and a 6 inch gap setting). The horizontal magnetic travel is to be recipe settable such that multiple passes can be achieved by sweeping the magnetic field back and forward along the horizontal while the subject cast film slowly passes under it or through it. A non-limiting example of a magnet useful for generating a magnetic field is GMW Model 3474 FG-140 Electromagnet.

In an embodiment, the electromagnet is mounted to a linear stage which has the ability to automatically move the electromagnet in the material direction. In an embodiment, the magnet has motorized translation capability on a 10 foot track. In an embodiment, the electromagnet location shall be recipe selected. In an embodiment, a secondary lift-off magnet, and space in the line may be set aside for this item.

As a non-limiting example, 1.75 Tesla (17.5 kilo gauss) is produced over a 10 inch wide field region within a 1 inch gap between the two poles of the magnet. Embodiments provide for automatic or manual adjustment. At 140 amps (max current) using a GMW Model 3474 FG-140 Electromagnet, about 1 Tesla can be induced over 4.7 inch gap. There may be fringe field of about 0.5 milli-Tesla (5G) at 1 m (approximately 40 inches) from the center of the magnet when fully energized to 140 A. Embodiments provide that no electrical components are within 40 to 80 inches from the pole cap.

The magnet may be cooled by water circulating from a chiller. In embodiments, power supply is be water cooled suitable for producing 1 Tesla (10 kilo gauss) over a 10 inch wide field region with a one-inch gap for 100% duty cycle.

Due to the effect of magnetic field, a lift off secondary magnet 100 with much less power may be necessary at the end of the line in order to neutralize the remnant field. Embodiments provide for this secondary magnet 100 being stationary. Embodiments that have ultraviolet-radiation zone 50 provide for an ultraviolet-radiation zone that cures or polymerizes monomers or polymerizable functional groups within the cast film.

The position of UV-radiation source relative to the substrate is adjustable and in some embodiments the ultraviolet-radiation zone is removable or not used. The system may be automated and recipe driven. In embodiments, UV-movement is on a two axis system, e.g., 10 foot horizontal run, and 1 foot from belt setting. Embodiments provide for the UV-radiation unit traveling along the path of the processing cast film. In some embodiments, movement of the UV-radiation unit is to be recipe settable such that UV radiation is near the shear zone, near the annealing zone, and/or tracks with the cast film as it passes through the UV radiation zone.

Embodiments provide for the following elements/characteristics to be used alone or in combination:
UV-LED system;
a selectable UV unit that allows for LED wavelength and intensity adjustment;
the UV unit mounted to an X-Z stage that will give the ability to move in the vertical and material directions;
the UV unit having motorized translation capability on a 10 ft track; and
the UV unit location capable of being recipe selected.

In annealing zone 60 or coarsening zone 60, embodiments provide for the cast film moving at a constant velocity in between a thermal region having an oscillating thermal gradient. The annealing-zone temperature gradient can be established using successive water cooled cold blocks placed on each side of a temperature controlled radiant rod heaters surrounded by mirror reflector that allows the thermal energy to be focused on the film to create spatially oscillating thermal gradients. In the embodiments, each block is laterally separated from each other by a 1 mm air gap spanning a length of 2.5 foot. Cold blocks may be 1 inch long and 8 inch wide while the hot blocks are 0.5 inch long and 8 inch wide (FIG. 1). An embodiment has a total of 20 cold and 20 hot blocks. Each block may have an individual temperature control capability and an embodiment provides min 50° C. and max 250° C. on the sample for the hot block and min 5° C. and max 40° C. on the sample for the cold block. Embodiments provide for low-speed capability in this zone that is about 1 cm/min. The temperature profile at a given point along the film in this annealing zone may be recorded using an appropriate thermal scanner with 0.5 inch precision to determine real time temperature profile.

In solvent evaporation zone 70, embodiments provide for laminar air flow as well as infrared underbed heaters being used. In embodiments, the heaters achieve and sustain process temps of 250° C. in the material being manufactured. Heating system embodiments include the following either alone or in combination:
(A) Air flow with HEPA Filters; and
(B) Utilization of "I.R." heaters.

Figure 4:
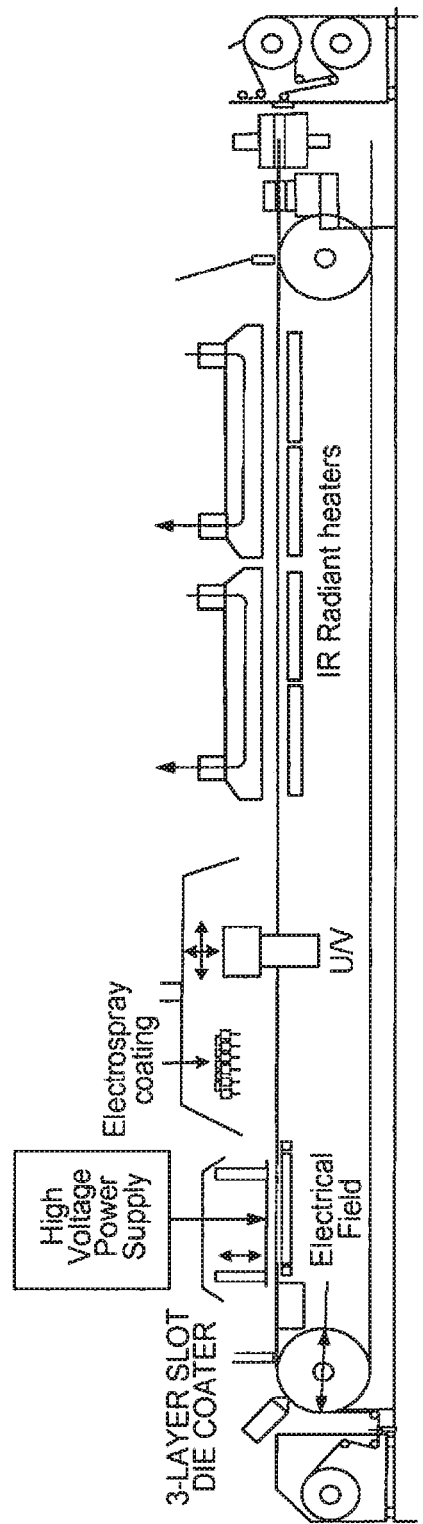
FIG. 4 is a schematic of the electromagnetic process (EMP) line in electric field mode.

Additional useful methods include known methods for evaporating solvent from a film. A method for embodiment is illustrated in FIG. 4, demonstrating an electrical-field alignment mode. On the left of the machine, the desired mixture of polymer solution is delivered by a steel carrier web through a precision slot die set at the desired thickness. This embodiment of film-casting zone 10 is capable of making films from 3 to 10 inches wide. The cast solution subsequently enters into electrical-field zone 30, which can provide a tunable AC electrical field of 0 to 25 kV/cm across the electrodes. The air gap can be accurately controlled by a precision alignment system designed into the upper electrode. The length of the electrical field zone can be changed to alter the exposure time by varying the conductive plates. In another embodiment, electric-field zone 30 is also designed to apply a DC-bias superposed with an oscillating AC field whose frequency and amplitude and shape (square, sine, sawtooth, etc.) are adjustable. During the passage of the cast solution through this zone the solvent concentration and/or temperature will be adjusted to keep the viscosity relatively low to effect the alignment polymer phase of choice. Radiant heaters mounted below the steel carrier at the end of the electric field zone are available to rapidly increase temperature and freeze-in the desired membrane morphology. The polymer mixture ratio, applied voltage and thermal finishing parameters can be varied in real-time to determine the optimal "composition-alignment-processing window" for a high-throughput. FIG. 4 also shows ultraviolet-radiation zone 50 having a UV lamp built into the EMP line immediately following the electric field zone that can be used for UV-curable matrices.

Although the invention has been described in detail with particular reference to certain embodiments detailed herein, other embodiments can achieve the same results. Variations and modifications of the present invention will be obvious to those skilled in the art, and the present invention is intended to cover in the appended claims all such modifications and equivalents.

What is claimed is:

1. A film-processing apparatus for manufacturing a cast film in a continuous process wherein the cast film passes through a combination of cast-film treatment zones in a single pass through the film-processing apparatus, the film-processing apparatus comprising:
a continuous carrier belt;
a film-casting zone adapted to deposit the cast film on the continuous carrier belt;
a shearing zone including a shearing belt adapted to selectively shear the cast film while the cast film is moving on the continuous carrier belt;
an electric-field zone adapted to selectively apply an electric field to the cast film while the cast film is moving on the continuous carrier belt;
a magnetic-field zone adapted to selectively apply a magnetic field to the cast film while the cast film is moving on the continuous carrier belt;
an ultraviolet-radiation zone adapted to selectively apply ultraviolet radiation to the cast film while the cast film is moving on the continuous carrier belt;
an annealing zone selectively applying temperature to the cast film;
a solvent-evaporation zone selectively evaporating a solvent from the cast film;
wherein the continuous carrier belt is operable to move the cast film deposited thereon from the film-casting zone through the shearing zone, the electric-field zone, the magnetic-field zone, the ultraviolet-radiation zone, the annealing zone, and the solvent-evaporation zone such that the cast film is selectively treated in one or more of the zones in the continuous process; and
a pick up roll receiving the cast film after the continuous carrier belt moves the cast film through the shearing zone, the electric-field zone, the magnetic-field zone, the ultraviolet-radiation zone, the annealing zone, and the solvent-evaporation zone and the cast film is selectively treated.

2. The apparatus of claim 1, wherein the distance between the shearing belt and the continuous carrier belt is adjustable.

3. The apparatus of claim 1, wherein the shearing belt is adapted to advance with or against or oscillating with and against the direction of travel of the continuous carrier belt.

4. The apparatus of claim 3, wherein the shearing belt is adapted to oscillate with and against the direction of travel at a frequency ranging up to 60 reversals per minute.

5. The apparatus of claim 1, wherein the electric field zone applies the electric field to the cast film while the cast film is in the shear zone.

6. The apparatus of claim 1, wherein the electric field zone includes an electromagnet mounted to a linear stage, which is adapted to move the electromagnet in the direction of travel of the continuous carrier belt.

7. The apparatus of claim 1, wherein the electric field zone includes an electromagnet, and wherein no electrical components are within 40 to 80 inches from a pole cap of the electromagnet.

8. The apparatus of claim 1, wherein the electric field zone includes an electromagnet, and the apparatus further comprises a lift off secondary magnet having less power than the electromagnet positioned at the end of the line in order to neutralize the remnant field.

9. The method of claim 1, wherein the annealing zone provides an oscillating thermal gradient in the direction of travel of the continuous carrier belt.

\* \* \* \* \*